(12) United States Patent
Kumar et al.

(10) Patent No.: US 7,079,488 B1
(45) Date of Patent: Jul. 18, 2006

(54) METHOD AND APPARATUS FOR MODIFYING THE BANDWIDTH OF AN ESTABLISHED ATM CALL IN RESPONSE TO AN IDENTIFICATION OF THE CONTENTS OF THE CALL

(75) Inventors: Rajesh Kumar, Fremont, CA (US); Snehal Karia, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 810 days.

(21) Appl. No.: 09/811,195

(22) Filed: Mar. 17, 2001

(51) Int. Cl.
*H04L 12/26* (2006.01)

(52) U.S. Cl. .................... 370/236; 370/252; 370/410

(58) Field of Classification Search ........ 370/464–469, 370/352, 401, 522, 529, 236, 410, 395.2, 370/395.21

See application file for complete search history.

(56) References Cited

U.S. PATENT DOCUMENTS

| | | | |
|---|---|---|---|
| 5,673,263 A | | 9/1997 | Basso et al. |
| 5,892,764 A | * | 4/1999 | Riemann et al. ............. 370/401 |
| 6,104,505 A | * | 8/2000 | Malik .......................... 358/434 |
| 6,122,272 A | | 9/2000 | Tomaszewski et al. |
| 6,185,736 B1 | | 2/2001 | Ueno |
| 6,272,553 B1 | * | 8/2001 | Way et al. ................... 709/250 |
| 6,486,975 B1 | * | 11/2002 | Verreault et al. ............ 358/445 |
| 6,735,176 B1 | * | 5/2004 | So ............................... 370/237 |
| 6,882,711 B1 | * | 4/2005 | Nicol ........................ 379/93.33 |
| 2001/0033642 A1 | * | 10/2001 | Adrishami et al. ..... 379/100.01 |
| 2001/0038631 A1 | * | 11/2001 | Kim et al. ................... 370/395 |

OTHER PUBLICATIONS

"Peak Cell Rate Modification by the Connection Owner," Broadband ISDN—B-ISDN Application Protocols for Access Signalling, ITU-T Recommendation Q.2963.1, Jul. 1996, 40 pages.

"Digital Subscriber Signalling System No. 2—Connection Modification: Modification Procedures for Sustainable Cell Rate Parameters," Broadband ISDN—B-ISDN Application Protocols for Access Signalling, ITU-T Recommendation Q.2963.2, Sep. 1997, 13 pages.

"Digital Subscriber Signalling System No. 2—Connection Modification: ATM Traffic Descriptor Modification with Negotiation by the Connection Owner," Broadband ISDN—B-ISDN Application Protocols for Access Signalling, ITU-T Recommendation Q.2963.1, May 1998, 19 pages.

* cited by examiner

*Primary Examiner*—Chau Nguyen
*Assistant Examiner*—Tri H. Phan
(74) *Attorney, Agent, or Firm*—The Law Office of Kirk D. Williams (57) ABSTRACT

Methods and apparatus are disclosed for changing the bandwidth or other traffic characteristic of an established packet call in response to an identification of the requirements of the call. In one implementation, an integrated access device ("IAD") is used to connect one or more devices to a packet network. When a device goes off-hook, a call is established through the packet network with an initial bandwidth, such as that which will support a compressed and silence suppressed voice call. The IAD monitors the received signal to determine whether a type of traffic is detected which requires a different call characterization. A request may be made to modify the traffic characterization of the established call to match the detected call characterization. In an ATM network, Q.9231.x may be used to request a change in the bandwidth of the originally established call.

17 Claims, 5 Drawing Sheets

METHOD AND APPARATUS FOR MODIFYING THE BANDWIDTH OF AN ESTABLISHED ATM CALL IN RESPONSE TO AN IDENTIFICATION OF THE CONTENTS OF THE CALL

FIELD OF THE INVENTION

This invention relates to communications systems having the capability of modifying a traffic characteristic of an established call; and more particularly, the invention relates to modifying the bandwidth of an established asynchronous transfer mode ("ATM") call in response to and identification of the type of call (e.g., modem, fax).

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Consumers and designers of these systems typically desire high reliability and increased performance at a reasonable price, as well as seamless integration with existing telephonic products. Increasingly, communications service providers are building their communications infrastructure based on packet technology, and in particular, ATM technology. However, there remains an embedded customer base which have packet network non-compliant telephonic equipment, such as phones, facsimile machines, modems, etc. Customers are not willing to throw discard this equipment and replace it with new ATM compatible equipment. Thus, a voice gateway ("VGW") is typically used at the customer premises (or possibly in a service provider location) which connects to the ATM network while typically providing at least one traditional analog telephone interface and possibly other packet network non-compliant interfaces (e.g., digital or analog telephone interfaces, etc.). The VGW performs the necessary protocol conversions and signaling to allow the packet network non-compliant telephonic equipment to be used in conjunction with a packet network.

Packet technology allows multiple types of traffic (e.g., voice, data, video) to be efficiently carried over a common network. Moreover, packet technology allows tremendous savings in bandwidth utilization especially for voice and other types of calls which can, for example, take advantage of compression and silence suppression techniques to decrease the amount of bandwidth required for a call. This bandwidth savings is amenable to both service providers and customers, as service providers are not required to over-engineer their systems as much as previously required, and consumers benefit, inter alia, with from this savings passed along as a decreased cost of service.

Although there are many pricing models used by service providers for which to charge customers, typically a customer can save money by placing a call with a lower maximum bandwidth requirement. For example, a voice call using compression and silence suppression can be placed that requires approximately an average of 60 cells per second with a peak of 100 cells per second, which is a substantial bandwidth and cost savings over clear channel voice call. Typically, a packet switching network will enforce (via a policing function) the established bandwidth parameters of the call. Thus, a call established at lower bandwidth will not support a call of substantially greater bandwidth, such as that of modem or facsimile traffic. Calls with traffic of this nature must be established at a higher bandwidth, which typically cost more in terms of economic and communication resources. However, the bandwidth of an established call may be changed by some networks, such as ATM networks supporting Q.2963.x.x signaling as defined by the International Telecommunication Union. These specifications include: "Peak Cell Rate Modification by the Connection Owner," International Telecommunication Union Recommendation Q.2963.x.1 (July 1996); "Digital Subscriber Signaling System No. 2—Connection Modification: Modification Procedures for Sustainable Cell Rate Parameters," International Telecommunication Union Recommendation Q.2963.x.2 (September 1997); and "Digital Subscriber Signaling System No. 2—Connection Modification: ATM Traffic Descriptor Modification With Negotiation by the Connection Owner," International Telecommunication Union Recommendation Q.2963.x.3 (May 1998).

Many consumers use a single phone line for voice, modem and facsimile traffic, and it is often inconvenient, costly and maybe unfeasible (e.g., only a single pair of phone wires) to connect telephones, modems, and facsimile devices to separate ports of a voice gateway device. Typically, a port is configured to establish a call over the packet network at a predetermined bandwidth. Thus, a port which supports voice, modem and facsimile traffic is typically configured to request a higher bandwidth connection than a call may require. Needed are new methods and systems which can automatically match the bandwidth requirements to the type of call being placed.

SUMMARY OF THE INVENTION

Systems and methods are disclosed for modifying the bandwidth of an established call across a packet switching system in response to an identification of the contents of the call. One embodiment signals to establish a call including a first traffic characteristic. A telephonic signal is received and monitored to determine a call characterization. Then, a modification of the call is requested to replace the first traffic characteristic with a second traffic characteristic based on the determined call characterization.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Methods and apparatus are disclosed for changing the bandwidth of an established packet call in response to an identification of the requirements of the call which may be used, inter alia, in a computer or communications system, such as an integrated access device, computer device, packet switching system, router, or other device or components thereof. Such methods and apparatus are not limited to a single computer or communications system. Rather, the architecture and functionality taught herein are extensible to an unlimited number of computer and communications systems, devices and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, integrated circuit chips, embedded processors, ASICs, methods, and computer-readable medium containing instructions. The embodiments described hereinafter embody various aspects and configurations within the scope and spirit of the invention.

Methods and apparatus are disclosed for changing the bandwidth (or other traffic characteristic) of an established packet call in response to an identification of the requirements of the call. These methods and apparatus may be used, inter alia, in a computer or communications system, such as an integrated access device ("IAD"), computer device, packet switching system, router, or other device or components thereof. In one embodiment, an IAD is used to connect one or more packet network non-compliant telephonic devices, such as, but not limited to telephones, modems and facsimile devices, to a packet network (e.g., an ATM network). When a device goes off-hook, a call is established through the packet network with an initial bandwidth, such as that which will support a compressed and silence suppressed voice call. In one embodiment, this initial bandwidth may be a variable packet rate, such as that identified by an average packet rate and a variance. The IAD monitors the received packet network non-compliant telephonic signal to determine whether a type of traffic is detected which requires a different call characteristic, such as, but not limited to a higher bandwidth than the original bandwidth available with the established call. If such a call characterization is detected, then a request is made to the packet network to modify the traffic characteristic of the established call to match the detected call characterization. In one embodiment, this new traffic characterization may be identified by a fixed packet rate. In an ATM network, Q.9231.x as recommended by the International Telecommunication Union may be used to request a change in the bandwidth of the originally established call. For example, calls may initially placed at a lower bandwidth to save allocation of unneeded resources, which typically equates to cost savings to a customer. Then, the established call can automatically be modified to the higher bandwidth required to support the traffic carried by a call.

As used herein, the term "packet" or "cell" refers to packets of all types, including, but not limited to, fixed length cells and variable length packets, each of which may or may not be divisible into smaller packets or cells, including the 52-byte, fixed length blocks used in ATM networks. Moreover, these packets may contain one or more types of information, including, but not limited to, voice, data, video, and audio information. Furthermore, the term "system" is used generically herein to describe any number of components, packet switch elements, packet switches, networks, computer and/or communication devices or mechanisms, or combinations thereof. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units.

Figure 1A:
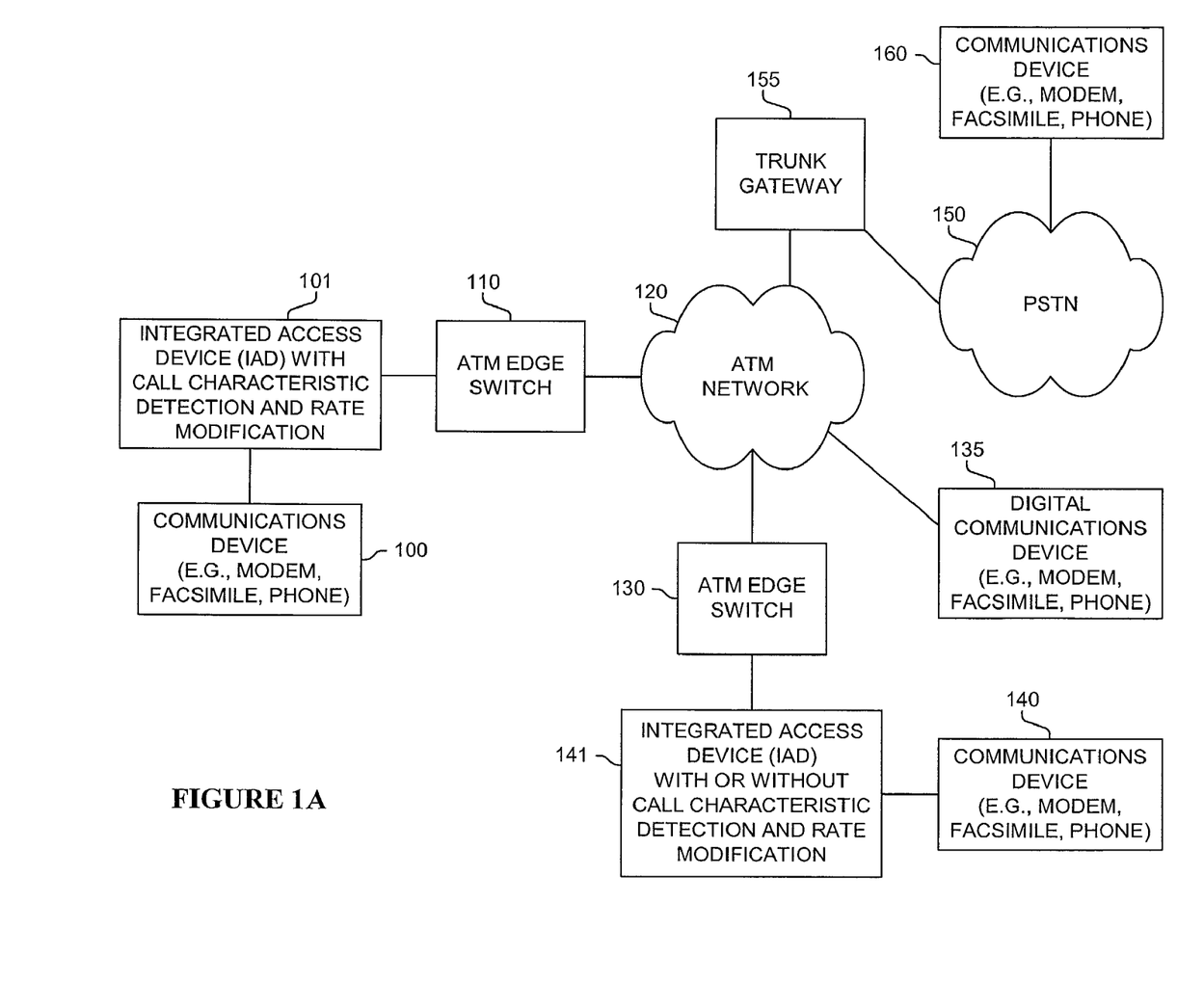
FIG. 1A is a block diagram of one embodiment of an integrated access device performing call characterization detection and call rate modification in the context of an exemplary network.

FIG. 1 provides a block diagram of one embodiment of an IAD performing call characterization detection and call rate modification in the context of an exemplary network. One or more communications devices 100 connect to an IAD 101. When one of the communications devices 100 goes off-hook, a connection request to another address (e.g., telephone number) is communicated by IAD 101 to edge switch 110 to establish a call having a first traffic characteristic to another communications device, such as, but not limited to digital communications device 135 directly connected to ATM network 120, communications device 160 via trunk gateway 155 and public switched telephone network ("PSTN") 150, or communications device 140 via ATM edge switch 130 and IAD 141. The traffic on the call is monitored by IAD 101, and if a certain type of traffic (e.g., modem, facsimile, etc.) is detected which requires a different traffic characteristic than the original call, then IAD 101 will automatically request a modification of the call to a requisite traffic characteristic. The operation of the embodiment illustrated in FIG. 1A is further described in relation to the other figures.

Figure 1B:
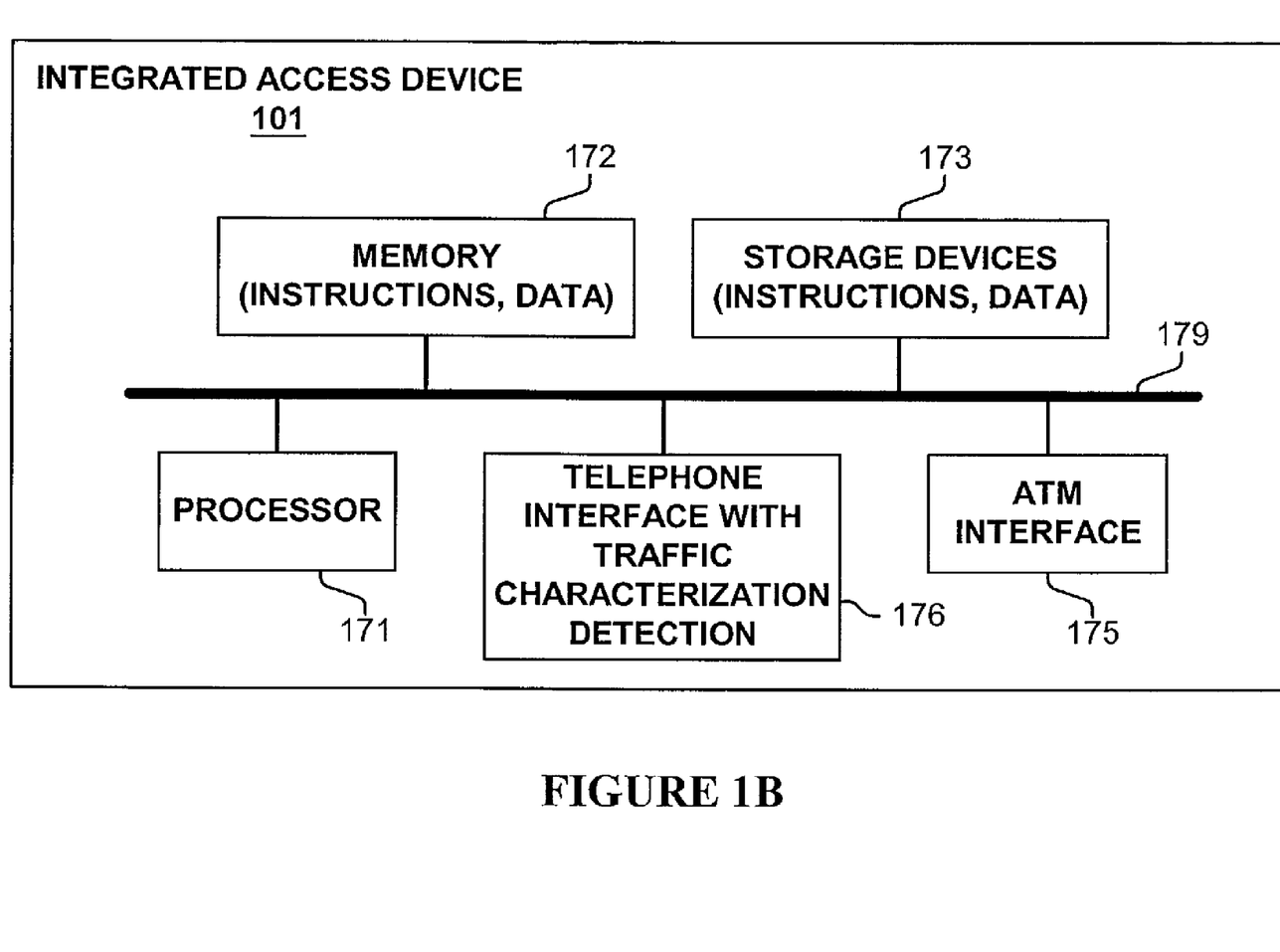
FIG. 1B is a block diagram of one embodiment of an integrated access device.

FIG. 1B illustrates one embodiment of IAD 101 (FIG. 1A), which automatically changes the bandwidth of an established packet call in response to an identification of the requirements of the call. IAD 101 is just one of numerous possible embodiments of a device embodying an aspect of the invention. Other embodiments might use specialized or custom circuitry.

As shown, IAD 101 comprises a processor 171, memory 172, storage devices 173, an ATM interface 175, and a telephone interface 176, which are electrically coupled via one or more communications mechanisms 179 (shown as a bus for illustrative purposes). The operation of IAD 101 is typically controlled by processor 171 using memory 172 and storage devices 173, and communicating with telephone interface 176 and ATM interface 175. Memory 172 is one type of computer-readable medium, and typically comprises random access memory (RAM), read only memory (ROM), integrated circuits, and/or other memory components. Memory 172 typically stores computer-executable instructions to be executed by processor 171 and/or data which is manipulated by processor 171 for implementing functionality in accordance with the invention. Storage devices 173 are another type of computer-readable medium, and typically comprise disk drives, diskettes, networked services, tape drives, and other storage devices. Storage devices 173 typically store computer-executable instructions to be executed by processor 171 and/or data which is manipulated by processor 171 for implementing functionality in accordance with the invention.

As used herein and contemplated by the invention, computer-readable medium is an extensible term, including not limited to, memory and storage devices and other storage mechanisms.

In one embodiment, telephone interface 176 recognizes an off-hook condition and collects a received telephone number from communications device 100 (FIG. 1A). ATM interface 175 signals to ATM edge network switch 110 (FIG. 1A) to establish a voice call of a first bandwidth using compression and silence suppression technology. Telephone interface 176 monitors the received telephone signal from communications device 100 using technology well-known in the art to determine the type of traffic being generated by communications device 100. In one embodiment, if telephone interface 101 receives a 2100 Hz tone or a fax preamble, it notifies processor 172 or ATM interface 175, which request a modification of bandwidth of the original call to a second, typically larger, bandwidth. Other embodiments might decrease the bandwidth of the original call in response to detection of a particular type of traffic which requires less bandwidth than the original call, or modify some other traffic characteristic of the original call in response to the detected type of traffic.

Figure 2:
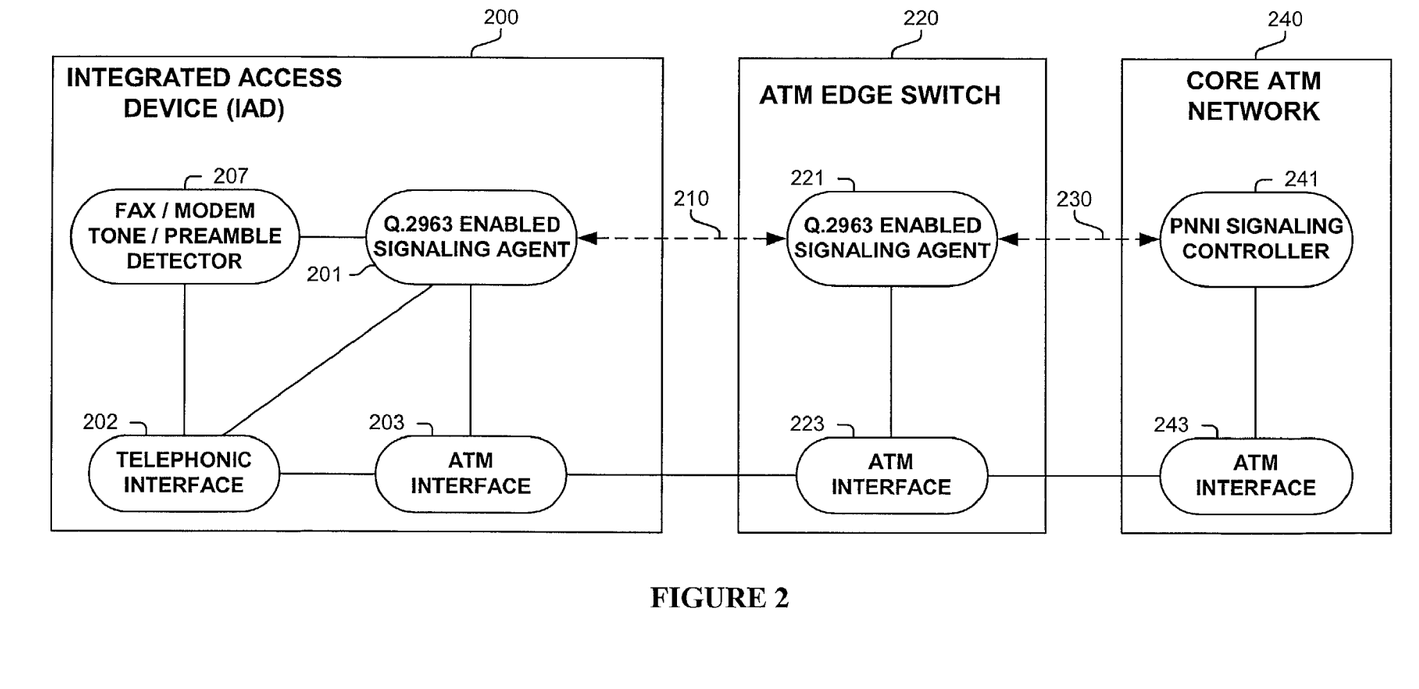
FIG. 2 is block diagram including one embodiment of integrated access device, ATM edge switch, and ATM core network.

FIG. 2 is a block diagram illustrating a partial logical architecture of one embodiment of an IAD 200, ATM edge switch 220, and core ATM network 240, which may in one embodiment correspond to IAD 101, ATM edge switch 110 and ATM network 120 shown in FIG. 1. IAD 200 includes a Q.2963.x enabled signaling agent 201 which performs the signaling operations for establishing and modifying the traffic characteristic of the established call in accordance with the invention. Q.2963.x enabled signaling agent 201 communicates with its peer Q.2963.x enabled signaling agent 221 of ATM edge switch 220 as illustrated by indication 210, which in turn communicates with its peer PNNI signaling controller 241 in core ATM network 240 as illustrated by indication 230, even though actual communication is transmitted between ATM interfaces 203, 223 and 243.

In one embodiment, telephone interface 202 recognizes an off-hook condition and collects a received telephone number from a connected communications device (such as communications device 100 of FIG. 1A). Q.2963.x enabled signaling agent 201 receives this information and initiates a call which is connected, typically using Q.2963.x enabled signaling agents 221 and 241. A fax/modem detector 207 monitors the telephonic signal received by telephone interface 202. Upon recognition of a type of traffic which may require a traffic characteristic different than that of the established call, fax/modem detector 207 notifies Q.2963.x enabled signaling agent 201, which then requests a modification of the established call.

Figure 3:
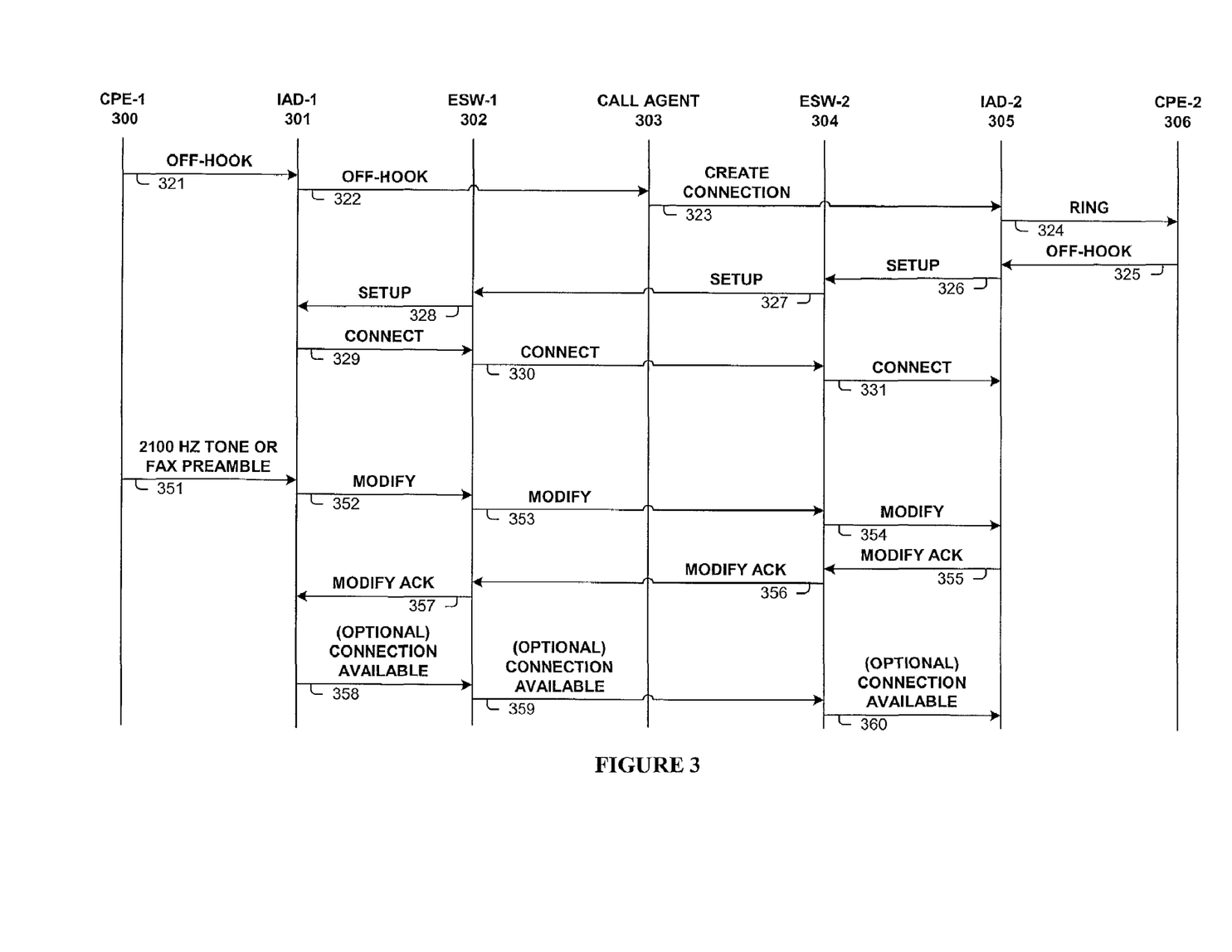
FIG. 3 is a message sequence chart illustrating one embodiment of dynamically changing a traffic characteristic of a call in response to the detection of a call characterization.

The operation of one embodiment of a network including an embodiment of an IAD according to the invention is illustrated in the message sequence chart of FIG. 3. Message sequence charts are well-known and often used to illustrate flow of signaling messages between components or systems. FIG. 3 illustrates the signaling of messages among CPE-1 300 (e.g., a telephone, modem, facsimile devices, etc.), IAD-1 301, edge switch ESW-1 302, call agent 303, edge switch ESW-2 304, IAD-2 305, and CPE-2 306. In one embodiment, these devices correspond to communications device 100, IAD 101, ATM edge switch 110, ATM network 120, ATM edge switch 130, IAD 141, and communications device 140 illustrated in FIG. 1. Note, for ease of reader understanding, only a single call agent is shown in the figures, while it is to be understood that there may be, in reality, a network of interconnected call agents that accomplishes this purpose.

CPE-1 300 signals an off-hook indication 321 to IAD-1 301, which sends off-hook message 322 to call agent 303 to establish the call. Call agent 303 sends create connection message 323 to IAD-2 305, which provides ring signal 324 to CPE-2 306. CPE-2 306 generates off-hook signal 326 which then sends setup message 326 to ESW-2 304. ESW-2 304 sends setup message 327 to ESW-1 302, which sends setup message 328 to IAD-1 301. IAD-1 301 sends connect message 329 to ESW-1 302 which then sends connect message 330 to ESW-2 304, which sends connect message 331 to IAD-2 305 to finish completion of establishing the original call having a certain traffic characteristic (e.g., bandwidth, quality of service, priority, etc.).

IAD-1 301 monitors the traffic sent over the established call by CPE-1 300. When CPE-1 300 generates a signal (such as a 2100 Hz tone or fax preamble signals 351) which indicates a mode shift to a different class of traffic which is incompatible with the traffic characterization of the original call, IAD-1 301 detects this signal. IAD-1 301 then sends a call modify request message 352 to request a different traffic characteristic for the original call to ESW-1 302, which sends a modify request message 353 to ESW-2 304, which sends a modify request message 354 to IAD-2 305. IAD-305 then sends a modify acknowledge message 355 to ESW-2, which sends a modify acknowledge message 356 to ESW-1 302, which then sends a modify acknowledge message 357 to IAD-1 357. The traffic characteristic of the call is then changed in the network as IAD-1 301 sends an optional connection available message 358 to ESW-1 302, which sends an optional connection available message 359 to ESW-2 304, which in turn sends an optional connection available message 360 to IAD-2 305 to complete the modification of a traffic characteristic of the established call.

Figure 4:
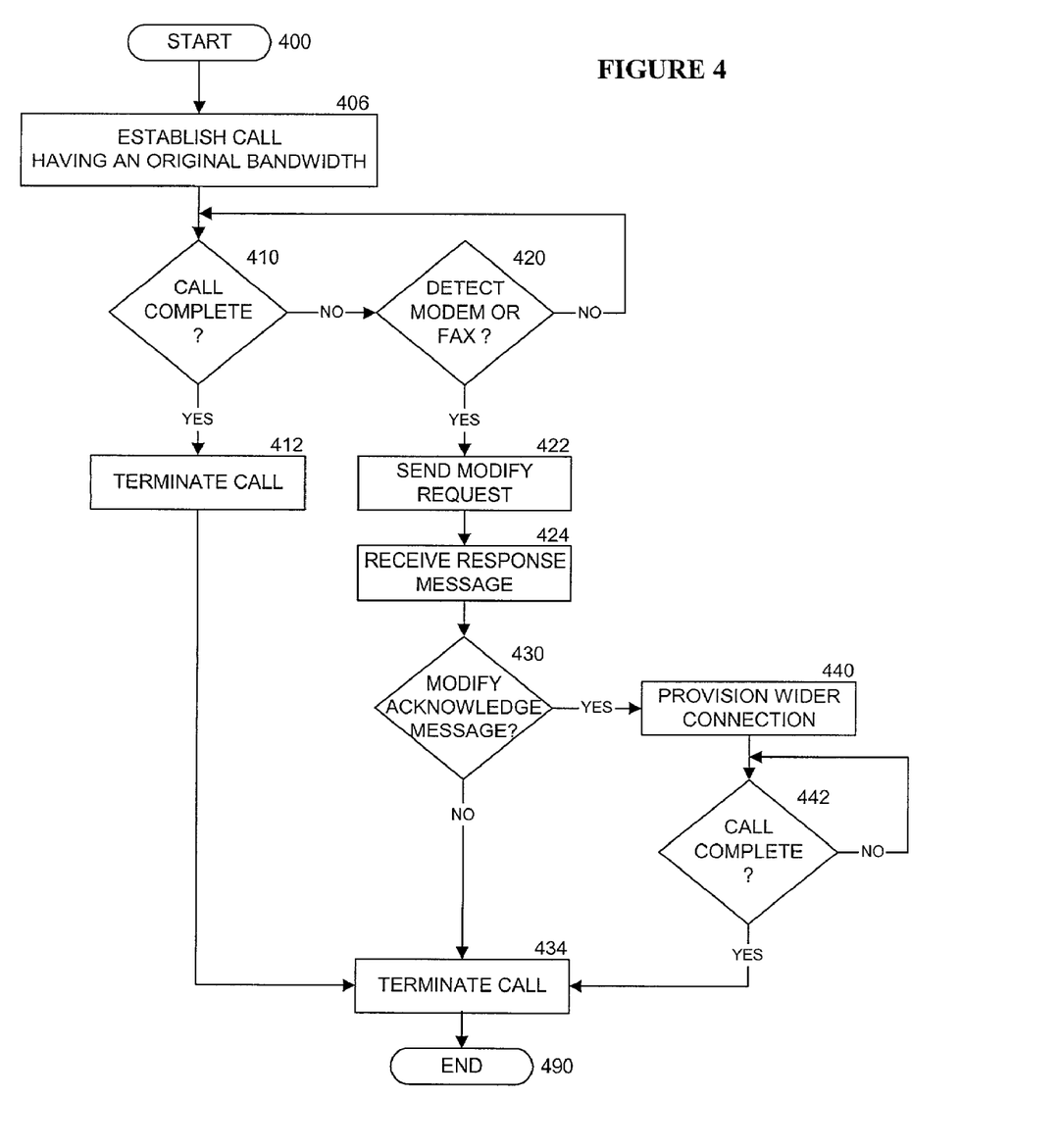
FIG. 4 is flow diagram of a process for modifying the rate of an established call in response to a type of traffic carried by the call.

FIG. 4 illustrates a flow diagram of one embodiment for determining a characterization of an established call and in response and requesting a modification of the established call to one with a different bandwidth or other traffic characteristic. Processing begins at process block 400, and proceeds to process block 406, where the call is establish with an initial bandwidth. When the call is completed as determined in process block 410, then processing proceeds to process block 434 to terminate the call. Otherwise, the traffic of the call is monitored as indicated by process block 420. If modem or facsimile traffic is detected in process block 420, then a request to modify the call is sent in process block 422, and its response is received in process block 424. If a setup message was received as determined in process block 430, then the call is modified in process block 440 to increase its bandwidth to accommodate the detected modem or facsimile traffic, and then the call is monitored until it is completed as indicated by process block 442. Otherwise, if a Modify Acknowledge message was not received as determined in process block 430, then the bandwidth is not available to support the type of traffic to be carried by the call. The call is then terminated in process block 434 and processing is complete as indicated by process block 490.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method performed by an integrated access device interfacing an ATM network non-compliant customer premises communications device with an ATM edge switch connected to an ATM network, the integrated access device being a standalone device separate from, and directly coupled to said communications device, the method comprising:

receiving an off-hook indication from said communications device;

in response to said receiving the off-hook indication, signaling to a call agent located in the ATM network to create to establish a call including a first traffic characteristic over the ATM network to a second customer premises communications device through a second integrated access device directly coupled to said second customer premises communications device;

receiving a telephonic signal from said communications device subsequent to said establishment of the call;

monitoring said received telephonic signal to determine that the call includes facsimile or modem traffic; and in response to said determination that the call includes facsimile or modem traffic, requesting and causing a modification of said established call to replace the first traffic characteristic with a second traffic characteristic, said request being communicated to the second integrated access device; and receiving a modification acknowledgement message from the second integrated access device in response to said request for modification of said established call.

2. The method of claim 1, wherein the first traffic characteristic includes a first packet rate, and the second traffic characteristic includes a second packet data rate.

3. The method of claim 2, wherein the first packet rate is a variable packet rate and the second packet rate is a fixed packet rate.

4. The method of claim 2, wherein the first packet rate is less than the second packet rate.

5. The method of claim 2, wherein the first packet rate is greater than the second packet rate.

6. The method of claim 1, wherein the first traffic characteristic includes a first bandwidth requirement, and the second traffic characteristic includes a second bandwidth requirement.

7. The method of claim 1, wherein the first traffic characteristic allows the use of compression or silence suppression technology and the second traffic characteristic does not allow for the use of compression or silence suppression technology.

8. The method of claim 1, wherein the integrated access device sends a connection available message to the second integrated access device in response to said receipt of the modification acknowledgement message from the second integrated access device.

9. An integrated access device interfacing a an ATM network non-compliant customer premises communications device with an ATM edge switch connected to an ATM network, the integrated access device being a standalone device separate from, and directly coupled to said communications device, the integrated access device comprising:

means for receiving an off-hook indication from said communications device;

means for signaling in response to said receiving the off-hook indication, to a call agent located in the ATM network to create to establish a call including a first traffic characteristic over the ATM network to an ATM network non-compliant second customer premises communications device through a second integrated access device directly coupled to said second communications device;

means for receiving a telephonic signal from the communications device subsequent to said establishment of the call;

means for detecting that the telephonic signal includes a modem signal or a facsimile signal;

means for requesting a modification of the call from the first traffic characteristic to a second traffic characteristic in response to detecting that the telephonic signal includes the modem signal or the facsimile signal, said requesting of the modification including communicating said request for modification of said established call to the second integrated access device; and means for receiving a modification acknowledgement message from the second integrated access device in response to said request for modification of said established call.

10. The integrated access device of claim 9, wherein said means for requesting the modification of the call includes means for generating a Q.2963.x signaling message.

11. The integrated access device of claim 9, wherein the first traffic characteristic includes a first packet rate, and the second traffic characteristic includes a second packet data rate.

12. The integrated access device of claim 11, wherein the first packet rate is a variable packet rate and the second packet rate is a fixed packet rate.

13. The integrated access device of claim 11, wherein the first packet rate is less than the second packet rate.

14. The integrated access device of claim 11, wherein the first packet rate is greater than the second packet rate.

15. The integrated access device of claim 9, wherein the first traffic characteristic includes a first bandwidth requirement, and the second traffic characteristic includes a second bandwidth requirement.

16. The integrated access device of claim 9, wherein the first traffic characteristic allows the use of compression or silence suppression technology and the second traffic characteristic does not allow for the use of compression or silence suppression technology.

17. The integrated access device of claim 9, wherein the integrated access device includes means for sending a connection available message to the second integrated access device in response to said receipt of the modification acknowledgement message from the second integrated access device.

* * * * *

UNITED STATES PATENT AND TRADEMARK OFFICE
CERTIFICATE OF CORRECTION

| | |
|---|---|
| PATENT NO. | : 7,079,488 B1 |
| APPLICATION NO. | : 09/811195 |
| DATED | : July 18, 2006 |
| INVENTOR(S) | : Kumar et al. |

It is certified that error appears in the above-identified patent and that said Letters Patent is hereby corrected as shown below:

Col. 7, line 60, replace "a an ATM" with -- an ATM --

Signed and Sealed this

Twenty-fourth Day of July, 2007

JON W. DUDAS
*Director of the United States Patent and Trademark Office*